United States Patent
Mericas et al.

(10) Patent No.: US 10,724,648 B2
(45) Date of Patent: Jul. 28, 2020

(54) FLOAT VALVE ASSEMBLY WITH DRAG FORCE DEPENDENT DEACTIVATION

(71) Applicant: Halliburton Energy Services, Inc., Houston, TX (US)

(72) Inventors: Christopher James Mericas, Houston, TX (US); Todd Anthony Stair, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/753,163

(22) PCT Filed: Sep. 24, 2015

(86) PCT No.: PCT/US2015/051988
§ 371 (c)(1),
(2) Date: Feb. 15, 2018

(87) PCT Pub. No.: WO2017/052556
PCT Pub. Date: Mar. 30, 2017

(65) Prior Publication Data
US 2018/0238460 A1 Aug. 23, 2018

(51) Int. Cl.
*F16K 15/18* (2006.01)
*E21B 33/14* (2006.01)
(Continued)

(52) U.S. Cl.
CPC ............ *F16K 15/181* (2013.01); *E21B 21/10* (2013.01); *E21B 21/103* (2013.01); *E21B 33/14* (2013.01);
(Continued)

(58) Field of Classification Search
CPC ........ E21B 21/10; E21B 21/103; E21B 33/14; E21B 34/10; E21B 2034/005; F16K 15/181; F16K 33/00
See application file for complete search history.

(56) References Cited

U.S. PATENT DOCUMENTS 6,802,374 B2   10/2004   Edgar et al.
8,893,796 B2   11/2014   Conner et al.
(Continued)

FOREIGN PATENT DOCUMENTS

EP          533369 A1      3/1993
WO    WO-2016/133539 A1   8/2016
WO    WO-2016/133541 A1   8/2016

OTHER PUBLICATIONS

International Search Report and Written Opinion from PCT/US2015/051988, dated May 30, 2016, 17 pages.
(Continued)

*Primary Examiner* — Marina A Tietjen
*Assistant Examiner* — Frederick D Soski
(74) *Attorney, Agent, or Firm* — Gilliam IP PLLC

(57) ABSTRACT

A float valve assembly includes a cylindrical housing defining an inner flow path and a check valve is positioned within the housing and movable between an open position, where uphole and downhole fluid flow through the inner flow path is allowed, and a closed position, where uphole fluid flow is prevented while downhole fluid flow is allowed. An activation member is movably positioned within the housing between a first position, where the activation member holds the check valve in the open position, and a second position, where the activation member moves axially and out of engagement with the check valve. A drag body is coupled to the activation member and fluid flow in the downhole direction generates a drag force on the drag body that places (Continued)

an axial force on the activation member to move the activation member to the second position.

20 Claims, 3 Drawing Sheets

(51) Int. Cl.
*E21B 34/10* (2006.01)
*E21B 21/10* (2006.01)
*F16K 33/00* (2006.01)
*E21B 34/00* (2006.01)

(52) U.S. Cl.
CPC .............. *E21B 34/10* (2013.01); *F16K 33/00* (2013.01); *E21B 2034/005* (2013.01)

(56) References Cited

U.S. PATENT DOCUMENTS

| | | |
|---|---|---|
| 2002/0148614 A1 | 10/2002 | Szarka et al. |
| 2003/0192695 A1 | 10/2003 | Dillenbeck et al. |
| 2007/0062700 A1 | 3/2007 | Webb et al. |
| 2007/0095533 A1 | 5/2007 | Rogers et al. |
| 2008/0245531 A1* | 10/2008 | Noske ................ E21B 21/08 166/373 |
| 2009/0071654 A1* | 3/2009 | O'Malley ............ E21B 34/105 166/323 |
| 2009/0205870 A1 | 8/2009 | Smith |

OTHER PUBLICATIONS

GB Application Serial No. 1801807.7, Examination Report, dated Jul. 18, 2019, 4 pages.
CA Application Serial No. 2,995,342, Office Action 1, dated Nov. 30, 2018, 3 pages.

* cited by examiner

FLOAT VALVE ASSEMBLY WITH DRAG FORCE DEPENDENT DEACTIVATION

BACKGROUND

In the oil and gas industry, wellbores are drilled into the Earth's surface to access underground reservoirs for the extraction of hydrocarbons. Once drilled, a wellbore is often lined with casing, which is secured within the wellbore with cement. In one cementing technique, a cement composition is pumped through the interior of the casing to the bottom of the well and the redirected back toward the Earth's surface via the annulus defined between the wellbore wall and the casing. In another cementing technique, commonly referred to as reverse-circulation cementing, the cement composition is pumped through the annulus to the bottom of the well and then back toward the surface via the interior of the casing. Once the cement composition cures within the annulus, the casing helps stabilize the wellbore walls to prevent collapse and also isolates the various surrounding subterranean formations by preventing the flow or cross-flow of formation fluids via the annulus. The casing further provides a surface to secure pressure control equipment and downhole production equipment.

When advancing a string of casing into a wellbore filled with wellbore fluids (e.g., drilling fluid or other fluids), the casing can act as a piston as it interacts with the wellbore fluids. Hydraulic forces resulting from such interaction can damage weak formations and require lengthy run-in times. To avoid this phenomenon, auto-filling float equipment is sometimes coupled to the end of the casing. The auto-filling float equipment typically includes a flapper-type float valve that is propped open so the casing can fill with wellbore fluid from the bottom of the string as the casing is lowered into the wellbore. This decreases the load on the formation and allows for quicker run-in speeds.

Prior to cementing the casing in place, the auto-fill float equipment must be deactivated, which converts the float valve into a type of check valve. Deactivating the auto-fill float equipment is typically done by pumping a wellbore projectile (e.g., a ball or a dart) through the float valve to shift a sleeve out of propping engagement with a flapper, and thereby allowing the flapper to close. Circulation from the surface prior to deactivation of the auto-fill is oftentimes necessary, and small flow ports around a seat where the wellbore projectile lands allow fluid to flow around the wellbore projectile at low rates. The flow ports, however, are relatively small and can become packed with debris, which can cause early deactivation when circulating from the surface. Additionally, the flow ports have a tendency to erode with extensive periods of circulation, which can result in the need for unusually high deactivation flow rates.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to downhole tools and, more particularly, to a float valve assembly that relies on drag forces to deactivate.

Embodiments described herein provide a float valve assembly that relies on drag forces generated by a drag body connected to an activation member. The drag body is positioned within a flow path of fluids flowing out of the float valve assembly in the downhole direction. Increasing the flow rate of the fluid in the downhole direction serves to correspondingly increase an axial force assumed by the activation member until the axial force is sufficient to move the activation member out of engagement with a flapper pivotably positioned in the float valve assembly. Moving the activation member out of engagement with the flapper allows the flapper to move to a closed position, where fluid flow in the uphole direction is prevented while fluid flow in the downhole direction is allowed. Accordingly, the embodiments of the present disclosure provide a tool that allows for surface circulation through the float valve assembly, but is not dependent on a wellbore projectile for deactivation. Moreover, the drag body allows for larger circulation flow paths and increased deactivation accuracy. As a result, circulation can be carried out for an extended period of time without risking plugging or erosion of ball seat ports.

Figure 1:
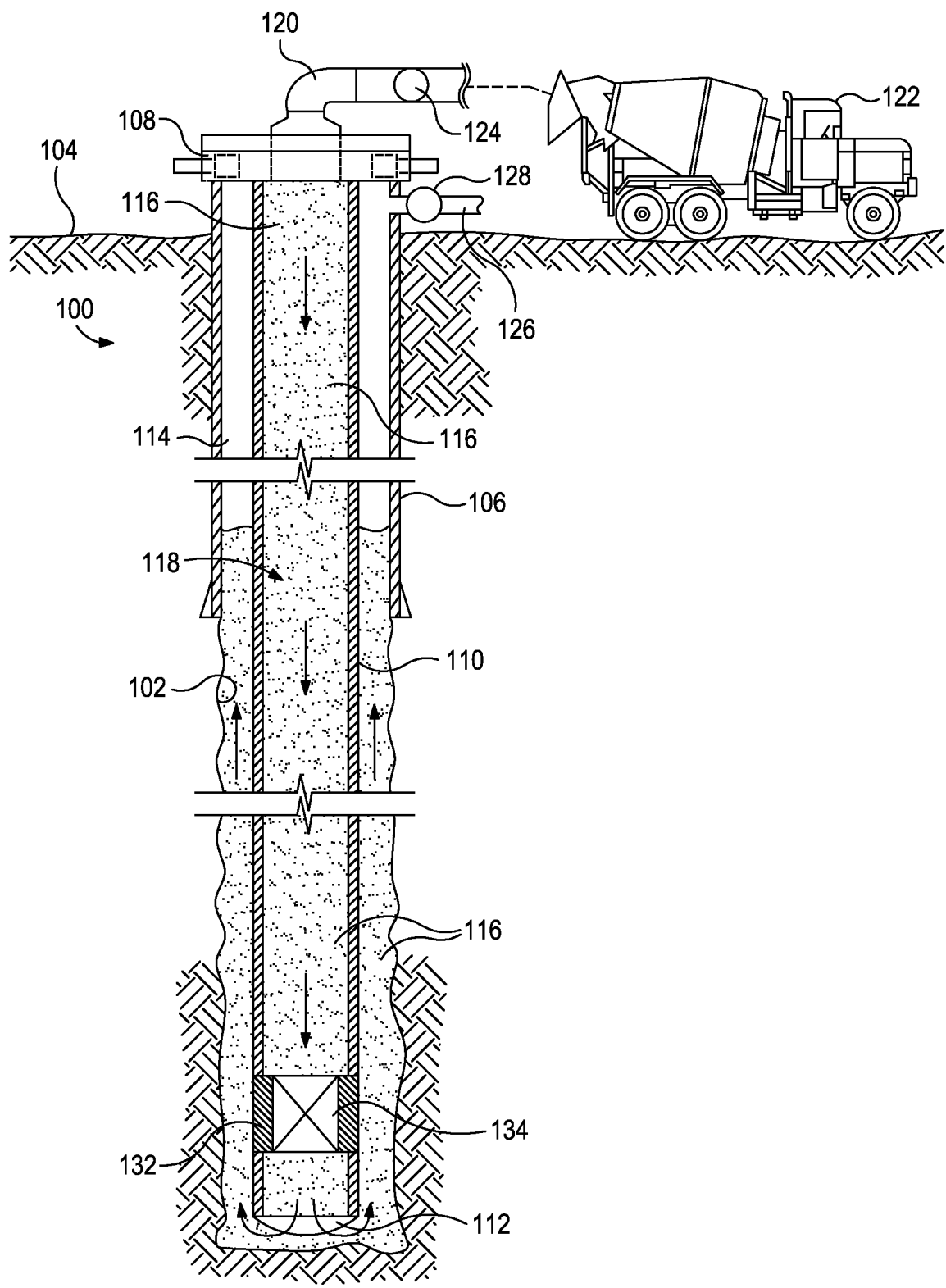
FIG. 1 illustrates a cross-sectional side view of a wellbore system that may employ one or more principles of the present disclosure.

Referring to FIG. 1, illustrated is a cross-sectional side view of a wellbore system 100 that may employ one or more of the principles of the present disclosure. More particularly, FIG. 1 depicts a wellbore 102 that has been drilled into the Earth's surface 104 and a surface casing 106 is extended into the wellbore 102 from a wellhead installation 108 arranged at the surface 104. An inner string of casing 110 is also suspended within the wellbore 102 from the wellhead installation 108 and generally positioned within the surface casing 106. A casing shoe 112 may be attached at the bottom-most portion of the casing 110, and an annulus 114 is defined between the wellbore 102 and the casing 110.

As used herein, the term "casing" refers to a plurality of tubular pipe lengths coupled (e.g., threaded) together to form a continuous tubular conduit of a desired length. It will be appreciated, however, that "casing" may alternatively refer to a single tubular pipe length or structure, without departing from the scope of the disclosure.

To secure the casing 110 within the wellbore 102, cement 116 may be pumped into the annulus 114. The cement 116 may be pumped into an interior 118 of the casing 110 and flow to the bottom thereof where the casing shoe 112 redirects the cement 116 back toward the surface 104 within the annulus 114. At the surface 104, a feed line 120 may be operably and fluidly coupled to the wellhead installation 108 and in fluid communication with the interior 118 of the casing 110. The feed line 120 may be fluidly coupled to a source 122 of the cement 116, and a feed valve 124 may regulate the flow of the cement 116 into the interior 118 of the casing 110. In FIG. 1, the source 122 of the cement 116 is a cement truck, but could alternatively comprise a cement head, a standalone pump, or any other cement pumping mechanism capable of introducing the cement 116 into the casing 110. A return line 126 may also be connected to the wellhead installation 108 and in fluid communication with the annulus 114. In some cases, as illustrated, the return line 126 may include a return valve 128 configured to regulate the flow of fluids returning to the surface 104 via the annulus 114.

A float collar 132 may be included in the string of casing 110 at or near the casing shoe 112, and a float valve assembly 134 may be positioned within the float collar 132 and operable as auto-filling float equipment. More particularly, the float valve assembly 134 may include a flapper (not shown) that is propped open while the casing 110 is advanced within the wellbore 102, and thereby mitigating the hydraulic forces resulting from fluid interaction between the casing 110 and any wellbore fluids present within the wellbore 102. Prior to cementing the casing 110 in place, the flapper is allowed to move to its closed position where it can operate as a check valve that prevents fluid from flowing toward the surface 104 within the interior 118.

Figure 2:
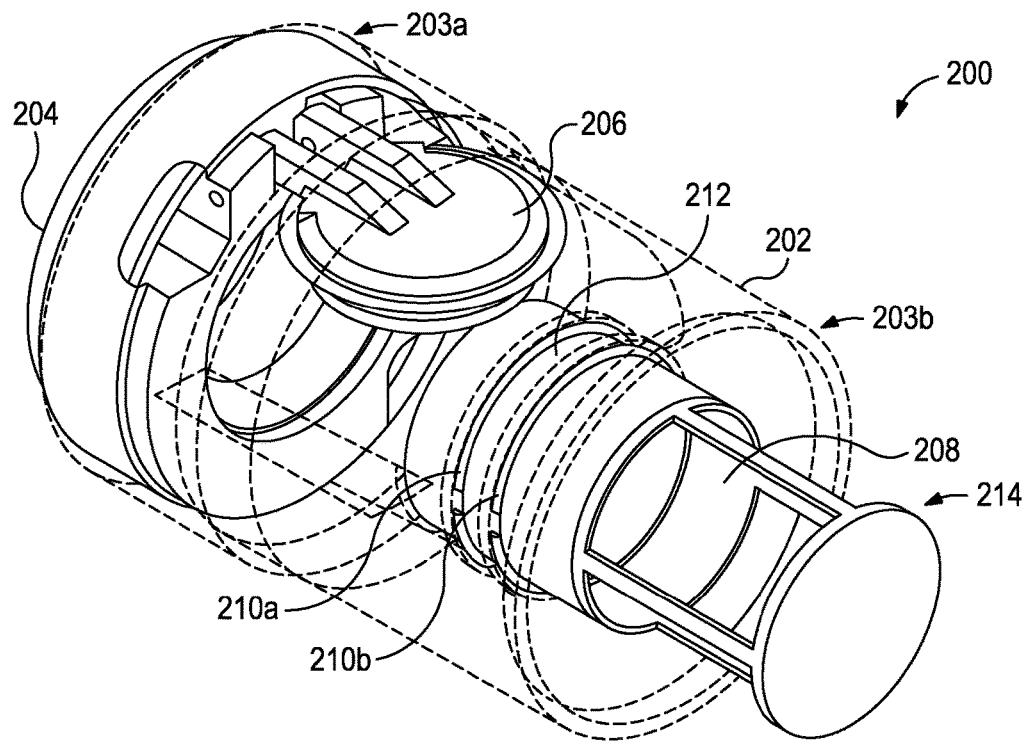
FIG. 2 is an isometric view of an exemplary float valve assembly.

FIG. 2 is an isometric view of an exemplary float valve assembly 200, according to one or more embodiments of the present disclosure. The float valve assembly 200 (hereafter the "assembly 200") may be the same as or similar to the float valve assembly 134 of FIG. 1. Accordingly, the assembly 200 may be secured within the float collar 132 (FIG. 1) at a select location along the casing 110 (FIG. 1) and operate as auto-filling float equipment.

As illustrated, the assembly 200 may include a generally cylindrical housing 202 having a first or uphole end 203a and a second or downhole end 203b. A check valve 204 may be secured within the housing 202 at or near the uphole end 203a. While shown as two distinct components, the check valve 204 and the housing 202 may, in at least one embodiment, form a monolithic component of the assembly 200. In some embodiments, as illustrated, the check valve 204 may comprise a flapper-type check valve, but could alternatively comprise other types of check valves including, but not limited to a poppet valve, a ball valve, and a butterfly valve.

In the illustrated embodiment, the check valve 204 includes a flapper 206 that is pivotably coupled to the check valve 204 and movable between open and closed positions. When the flapper 206 is in the open position, as depicted in FIG. 2, fluid flow through the assembly 200 between the uphole and downhole ends 203a,b (in either direction) is allowed. When the flapper 206 is in the closed position, however, fluid flow through the assembly 200 in the uphole direction (i.e., originating from the downhole end 203b) is prevented, while fluid flow through the assembly 200 in the downhole direction (i.e., originating from the uphole end 203a) is allowed.

The assembly 200 may further include an activation member 208 movably positioned within the housing 202. In some embodiments, as illustrated, the activation member 208 may take the shape of a cylindrical sleeve or the like. The activation member 208 is movable between a first position, where the activation member 208 engages and holds the flapper 206 in the open position, and a second position, where the activation member 208 moves axially within the housing 202 and out of engagement with the flapper 206. Once the activation member 208 disengages the flapper 206, the flapper 206 will then be able to pivot to the closed position.

A pair of lock rings may be used to help maintain the activation member 208 in the first position. More particularly, a first or upper lock ring 210a and a second or lower lock ring 210b may be positioned on opposing axial ends of a radial shoulder 212 defined on the outer surface of the activation member 208. One or both of the upper and lower lock rings 210a,b may comprise a split lock ring that exhibits a known spring force. To move the activation member 208 to the second position and out of engagement with the flapper 206, the radial shoulder 212 must engage the lower lock ring 210b with sufficient axial force to overcome its spring force. Accordingly, the radial shoulder 212 is secured axially between the upper and lower lock rings 210a,b in the first position until a required axial force is applied to the activation member 208 in the downhole direction. This process will be described in more detail below.

The assembly 200 may also include a drag body 214 coupled to the activation member 208 and used to help the activation member 208 move from the first position to the second position. In some embodiments, as illustrated, the drag body 214 may form an integral extension of the activation member 208. In such embodiments, the, the drag body 214 and the activation member 208 may form a monolithic structure. In other embodiments, however, the drag body 214 may comprise one or more component parts or pieces that may be operatively coupled to the activation member 208. In at least one embodiment, as illustrated, the drag body 214 may extend axially from the activation member 208 and at least partially out of the housing 202.

According to the present disclosure, and as will be described in greater detail below, the drag body 214 may allow fluid flow circulation through the assembly 200 in both the uphole and downhole directions. Fluid flow in the downhole direction, however, impinges on the drag body 214 and generates a drag force that acts on the activation member 208 in the axial direction. Increasing the downhole fluid flow through the assembly 200 may correspondingly increase the drag force generated by the drag body 214. Once a predetermined drag force is generated, the spring force of the lower lock ring 210b may be overcome at the radial shoulder 212, thereby allowing the activation member 208 to move to the second position and out of engagement with the flapper 206.

Figure 3A:
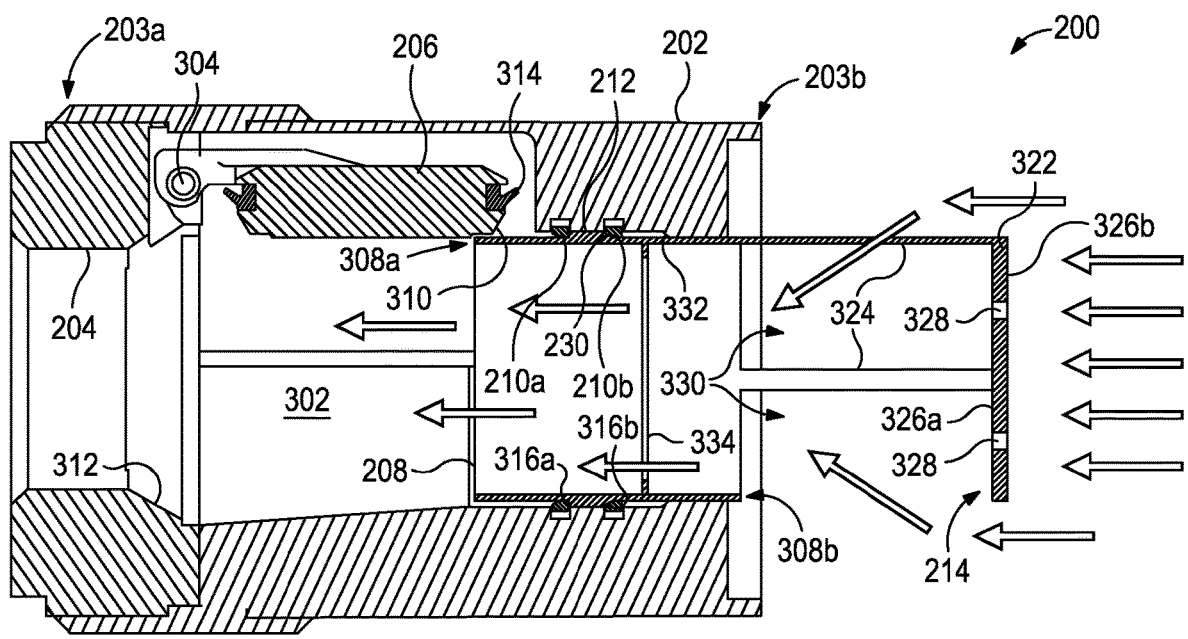
FIGS. 3A-3C are progressive cross-sectional side views of the assembly of FIG. 2.
Figure 3B:
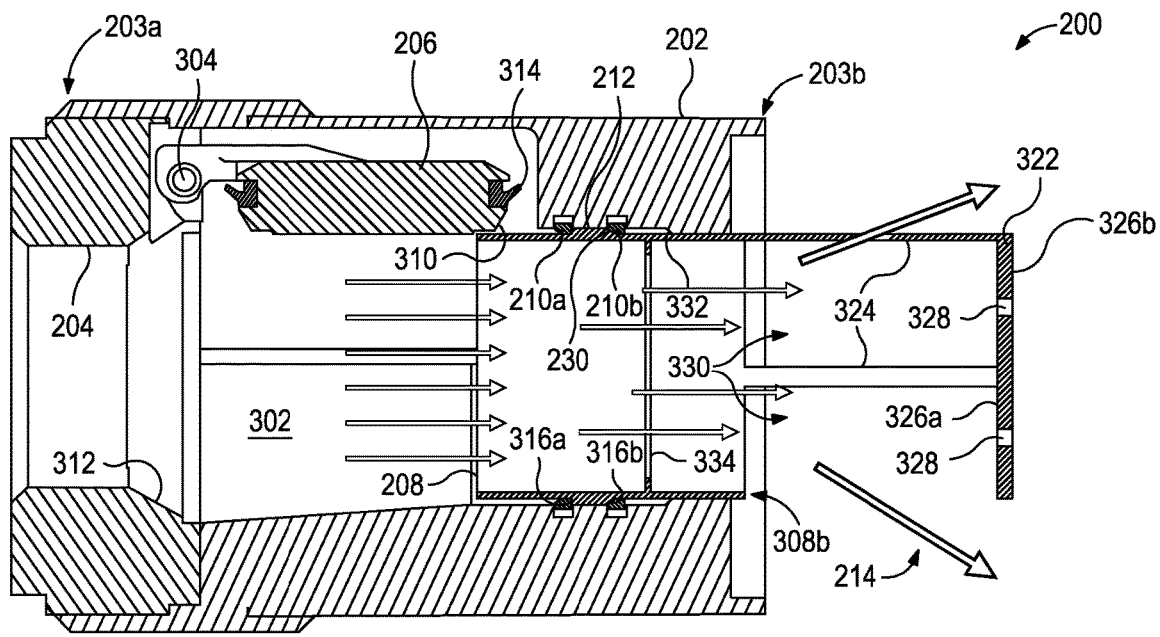
Figure 3C:
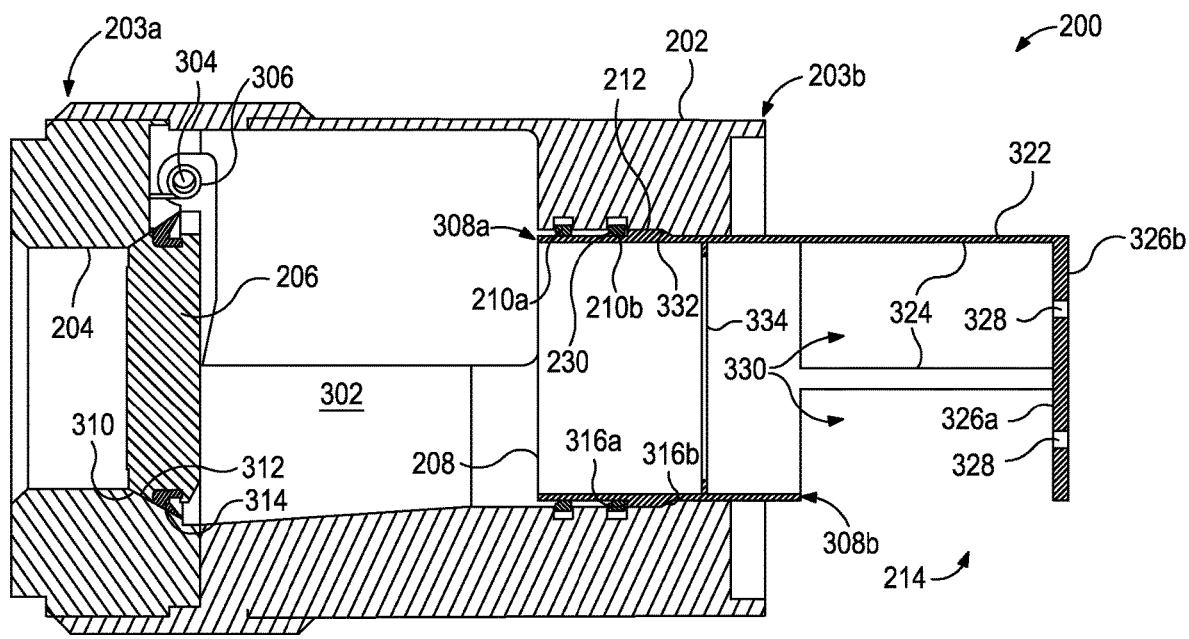

FIGS. 3A-3C are progressive cross-sectional side views of the assembly 200, according to one or more embodiments. More particularly, FIGS. 3A-3C depict the assembly 200 as the activation member 208 moves from the first position, where the flapper 206 is in the open position as shown in FIGS. 3A and 3B, to the second position, where the flapper 206 is moved to the closed position as shown in FIG. 3C. Similar numerals from FIG. 2 that are used in FIGS. 3A-3C correspond to like elements or components of the assembly 200 that may not be described again.

As illustrated, the housing 202 may define an inner flow path 302 for fluids to communicate through the assembly 200 in either direction (uphole or downhole) between the uphole and downhole ends 203a,b of the housing 202. The check valve 204 may be secured within the housing 202, and the flapper 206 and the activation member 208 may be arranged within the inner flow path 302. The flapper 206 is pivotable about a pin 304, and is biased toward the closed position with a torsion spring 306 (FIG. 3C). As shown in FIGS. 3A and 3B, when the activation member 208 is in the first position, the flapper 206 may be propped in the open position by engaging and otherwise resting on an uphole end 308a of the activation member 208. Once the activation member 208 is moved to the second position and out of engagement with the flapper 206, the spring force of the torsion spring 606 may urge the flapper 206 to the closed position.

In the closed position, an angled surface 310 defined about the periphery of the flapper 206 may be received by a correspondingly angled flapper seat 312 defined on the check valve 204. In some embodiments, the angled surface 310 may sealingly engage the angled flapper seat 312, and thereby prevent fluid flow in the uphole direction (i.e., to the left in FIGS. 3A-3C) through the assembly 200. Moreover, in some embodiments, a seal 314 be provided about the circumference of the flapper 206 and may also sealingly engage the angled flapper seat 312 when the flapper 206 is moved to the closed position.

The radial shoulder 212 may form an annular ring that extends about the entire outer circumference of the activation member 208. In some embodiments, as illustrated, the radial shoulder 212 defined on the outer surface of the activation member 208 may provide a planar upper face 316a and an angled lower face 316b. More particularly, the upper face 316a may be defined generally orthogonal to a longitudinal axis of the assembly 200 and otherwise face axially toward the uphole end 203a of the housing 202 at any point thereon. Alternatively, the upper face 316a can be frustoconical by flaring upwardly and radially outward. Other shapes of the upper face 316a are also contemplated, such as concave and/or convex contoured surfaces.

The angled lower face 316b faces radially outward and downwardly (i.e., toward the downhole end 203b of the housing 202) at any point thereon. By further example, the lower face 316b can form an oblique angle relative to the longitudinal axis of the assembly 200. Such an angle can be selected to determine, at least in part, the axial force required to shift the radial shoulder 212 axially past the lower lock ring 210b. The angle defined by the lower face 316b, for example, can range between about 10° and about 80° with respect to the longitudinal axis of the assembly 200. Depending on the given flow geometry for the assembly, however, the angle defined by the lower face 316b can be adjusted to any angle between 0° and 90° to alter or customize the axial force required to shift the radial shoulder 212 axially past the lower lock ring 210b. As will be appreciated, the greater the angle of the angled lower face 316b, the greater the axial force required to shift the radial shoulder 212 axially past the lower lock ring 210b. On the other hand, smaller angles can result in a smaller required axial force. The required force, however, is sufficient to avoid premature axial movement of the activation member 208 to the second position.

The upper and lower lock rings 210a may be positioned within upper and lower annular recesses 318a and 318b, respectively, defined in the outer housing 202. One or both of the upper and lower lock rings 210a,b may be formed as circumferentially discontinuous rings that can radially expand to increase its circumference. The upper and lower lock rings 210a,b may be formed of a variety of materials including, but not limited to, brass, aluminum, steel, spring steel, a composite material, an elastomer, a plastic, a thermoplastic, a thermoset polymer, and any combination thereof. Material selection for the upper and lower lock rings 210a,b can provide predetermined retention of the radial shoulder 212 up to selected force limits, beyond which the upper and lower lock rings 210a,b may be elastically or plastically deformed to allow passage of the radial shoulder 212. Moreover, the materials for the upper and lower lock rings 210a,b may be selected to be easily drillable, since the assembly 200 may eventually be drilled out after completion of a downhole operation.

The upper lock ring 210a prevents the activation member 208 from moving upwardly (i.e., in the uphole direction) within the inner flow path 302 by engaging the planar upper face 316a of the radial shoulder 212. As shown in FIGS. 3A and 3B, the upper lock ring 210a may be biased to contract radially inward such that the upper lock ring 210a contacts and engages the upper face 316a of the radial shoulder 212. The upper face 316a and the corresponding axial surface of the upper lock ring 210a may be such that an upward force applied by the upper face 316a to the upper lock ring 210a does not radially expand the upper lock ring 210a.

The lower lock ring 210b may be configured to engage the angled lower face 316b of the radial shoulder 212 and may, in some embodiments, define a correspondingly angled surface 320. More particularly, the angled surface 320 of the lower lock ring 21b may be configured to axially engage the angled lower face 316b of the radial shoulder 212. For example, the angled surface 320 can form an oblique angle relative to the longitudinal axis of the assembly 200, and the angle of the angled surface 320 can determine, at least in part, the force required to shift the activation member 208 past the lower lock ring 210b. In some embodiments, the angle formed by the angled surface 320 can be equal to the angle formed by the angled lower face 316b.

Other radial locking mechanisms can be used to controllably retain the activation member 208 in the first position. For example, one or more retractable protrusions, biased radially inwardly, can individually engage corresponding portions of the radial shoulder 212. By further example, a radial locking mechanism can be provided to retain the activation member 208 until a force by the activation member 208 causes elastic or plastic deformation of such a radial locking mechanism. Other locking methods could include collet mechanisms, j-slots, snap-fit, interference fit, or friction alone.

The drag body 214 may be coupled to and extend from the downhole end 308b of the activation member 208. In some embodiments, as mentioned above, the drag body 214 forms an integral extension of the activation member 208 such that the activation member 208 and the drag body 214 form a monolithic component or part of the assembly 200. In other embodiments, however, the drag body 214 may comprise one or more component parts that may be assembled and operatively coupled to the activation member 208. As indicated above, the drag body 214 may be configured to generate a drag force as fluid circulates through the assembly 200 in the downhole direction and impinges on the drag body 214. The resulting drag force acts on the activation member 208 in the axial direction as an axial force, and increasing the axial force to a predetermined level allows the radial shoulder 212 to overcome the spring force of the lower lock ring 210b and move the activation member 208 to the second position.

To generate sufficient drag force that translates into axial force utilized by the activation member 208, the drag body 214 may exhibit several designs or configurations. While one general design of the drag body 214 is specifically shown and described herein, it will be appreciated that numerous other designs and configurations of the drag body 214 may alternatively be employed, without departing from the scope of the disclosure.

In the illustrated embodiment, the drag body 214 is depicted as comprising a disc 322 operatively coupled to the activation member 208 by one or more longitudinally extending ribs 324. The disc 322 may provide an uphole or first face 326a and a downhole or second face 326b. The uphole face 326a faces generally in the uphole direction (i.e., to the left in FIGS. 3A-3C), and the downhole face 326b is opposite the uphole face 326a and faces generally in the downhole direction (i.e., to the right in FIGS. 3A-3C). In some embodiments, one or both of the uphole and downhole faces 326a,b may be positioned orthogonal to the longitudinal axis of the assembly 200. In other embodiments, one or both of the uphole and downhole faces 326a,b may be positioned at an angle with respect to the longitudinal axis of the assembly 200, without departing from the scope of the disclosure.

The disc 322 may be circular in shape, as illustrated, but could alternatively exhibit any other cross-sectional shape including, but not limited to, oval, kidney-shaped, polygonal (e.g., triangular, square, rectangular, etc.), teardrop-shaped, airfoil-shaped, or any combination thereof. In some embodiments, one or more holes 328 may be defined in the disc 322 and extend between the uphole and downhole faces 326a,b. As will be appreciated, the holes 328 may help modify or optimize the drag force generated by the drag body 214 and, more particularly, by the disc 322. An increased number or size of the holes 328, for example, will decrease the drag force generated by the drag body 214. In contrast, a decreased number or size of the holes 328 will increase the drag force generated by the drag body 214.

The ribs 324 may define one or more flow windows 330 through which fluids may flow during operation of the assembly 200. As will be appreciated, the number of flow windows 318 may depend on the number of ribs 324 extending between the disc 322 and the activation member 208. In some embodiments, the ribs 324 may comprise rigid members, but could alternatively be flexible, elastic, or limp members, depending on the materials used. For instance, in some embodiments, one or both of the disc 322 and the ribs 324 may be made of a fabric material. In such embodiments, the drag body 214 may operate similar to a parachute in generating the drag force. Moreover, in such embodiments, the cross-sectional shape of the disc 322 and/or the ribs 324 may vary.

The geometry of one or both of the disc 322 and the ribs 324 may be modified to alter and optimize the drag force generated by the drag body 214 at a given flow rate through the assembly 200 in the downhole direction, and thereby modify the axial force assumed by the activation member 208. More particularly, the shape and size of the disc 322 and/or the ribs 324 may be altered to provide a larger or smaller drag force relative to a known flow rate of fluid flowing through the inner flow path 302 in the downhole direction. A smaller-sized disc 322, for example, would result in a smaller drag force being generated as fluids impinge upon the uphole face 326a of the disc 322. A larger-sized disc 322, however, would result in a larger drag force being generated as the fluids impinge upon the uphole face 326a of the disc 322. Moreover, as mentioned above, the size and number of the holes 328 defined through the disc 322 may be altered to achieve an increased or decreased drag force, as desired.

Similarly, larger (angularly thicker) ribs 324 may reduce the size of the flow windows 330 and thereby increase the drag force generated as more fluid is able to impinge on the ribs 324. On the other hand, smaller (angularly thinner) ribs 324 will increase the size of the flow windows 330 and thereby decrease the drag force generated as less fluid will impinge on the ribs 324.

Moreover, in some embodiments, one or both of the disc 322 and the ribs 324 may be coated (covered) with various materials or coatings. These materials and coatings may prove advantageous in changing the coefficient of friction, thus allowing the drag force to be adjusted or customized.

In embodiments where the drag body 214 comprises one or more component parts or pieces coupled to the downhole end 308b of the activation member 208, the drag body 214 may be considered modular. More particularly, in such embodiments, parts of the drag body 214 may be switched or substituted with parts of different sizes, configurations, or of different materials in order to optimize operation of the drag body 214 for a particular application. For example, in at least one embodiment, the disc 322 might be swapped out at a rig site for a disc 322 of a different size or made of a different material such that it will be more amenable to the well where the assembly 200 will be deployed. Similarly, the ribs 324 might be swapped out at the rig site for ribs 324 of a different size or made of different materials to fit a particular downhole operation. Accordingly, the drag body 214 may be modular in fashion so that different drag profiles may be generated depending on job specific parameters. As will be appreciated, this allows for the drag force required to deactivate the flapper 206 to be tailored for each operating situation.

Exemplary operation of the assembly 200 is now provided with continued reference to FIGS. 3A-3C. Reference is first made to FIG. 3A. The float collar 132 (FIG. 1) including the assembly 200 is run into the wellbore 102 (FIG. 1) as coupled to the inner casing 110 (FIG. 1). The wellbore 102 is generally filled with fluid, such as drilling mud, and the casing 110 is floated into the wellbore 110. While the casing 110 is advanced within the wellbore 102, the flapper 206 is maintained in the open position by engaging the uphole end 308a of the activation member 208. As a result, fluids may circulate through the assembly 200 in the uphole direction, as indicated by the arrows in FIG. 3A. As illustrated, the fluid may flow around the drag body 214 to enter the inner flow path 302. More particularly, the fluid may flow through the flow windows 330 and, if included, through the holes 328 defined in the disc 322 to access the inner flow path 302.

In FIG. 3B, once the assembly 200 is advanced to a predetermined location within the wellbore 102 (FIG. 1), a fluid may be circulated from the surface 104 (FIG. 1) and through the assembly 200 in the downhole direction, as indicated by the arrows of FIG. 3B. In some embodiments, the fluid may be cement 116 (FIG. 1) used to fill the annulus 114 (FIG. 1), but may alternatively comprise a drilling fluid, water, or brine. As long as the flow rate of the fluid in the downhole direction is lower than the flow rate that results in deactivating the flapper 206, the activation member 208 will stay held in place by the upper and lower lock rings 210a,b.

To deactivate the float collar 132 (FIG. 1) and thereby move the flapper 206 to the closed position, the activation member 208 must be moved to the second position and otherwise out of engagement with the flapper 206 at its uphole end 308a. This may be accomplished by increasing the flow rate of the fluid in the downhole direction, which correspondingly increases the drag force generated by the drag body 214. As the drag force increases, the axial force assumed by the activation member 208 correspondingly increases and forces the radial shoulder 212 against the lower lock ring 210b in the downhole direction. Once a predetermined axial force is applied against the lower lock ring 210b, the spring force of the lower lock ring 210b may be overcome, thereby allowing the radial shoulder 212 to bypass the lower lock ring 210 and move the activation member 208 axially to the second position.

In FIG. 3C, once the activation member 208 moves out of engagement with the flapper 206, the hydrostatic pressure in the wellbore 102 (FIG. 1) and the spring force of the torsion spring 306 may urge the flapper 206 to the closed position 206. In the closed position, the angled surface 310 of the flapper 206 and the seal 314 may be received by the angled flapper seat 312 defined on the check valve 204. The sealing engagement between the flapper seat 312 and the angle surface 310 and the seal 314 may prevent fluid flow in the uphole direction (i.e., to the left in FIGS. 3A-3C) through the assembly 200.

With the activation member 208 in the second position, the lower lock ring 210b may contract radially inward again and engage the upper face 316a of the radial shoulder 212, thereby preventing the activation member 208 from moving axially uphole again. The surface contours of the lower lock ring 210b and the planar upper face 316a can be such that an upward force applied by the upper face 316a to the lower lock ring 210b does not tend to cause radial expansion of the lower lock ring 210b. Moreover, the angled lower face 316b of the radial shoulder 212 can settle upon and otherwise engage a reduced diameter portion 332 of the housing 202. In some embodiments, the lower face 316b and the reduced diameter portion 332 can provide complementary surface contours to maximize an amount of surface contact between the lower face 316b and the reduced diameter portion 332.

With the flapper 206 in the closed position, a cementing operation can commence where the cement 116 (FIG. 1) is pumped through the assembly 200 in the downhole direction. The fluid pressure of the cement 116 may overcome the spring force of the torsion spring 306 and the hydrostatic pressure below the assembly 200, thereby allowing the flapper 206 to re-open and otherwise allow the cement 116 to traverse the assembly 200 in the downhole direction. The flapper 206, however, is able to control any back flow of the cement 116 in the uphole direction, as the angled surface 310 of the flapper 206 and the seal 314 sealingly engage the angled flapper seat 312 defined on the check valve 204.

After the cementing operation is completed, the assembly 200 may be drilled out by means known in the art to provide an open casing bore to the bottom of the casing 110 (FIG. 1).

Still referring to FIGS. 3A-3C, in some embodiments, increasing the drag force on the drag body 214 may be insufficient to move the activation member 208 to the second position. Such a scenario may occur when the drag body 214 is damaged or otherwise inoperable. In such embodiments, the activation member 208 may further include an annular lip 334 extending from an inner wall thereof. The annular lip 334 can have an inner cross-sectional dimension (e.g., a diameter) that is smaller than an outer cross-sectional dimension (e.g., a diameter) of a wellbore projectile, such as a ball, a plug, or a dart. Accordingly, when the drag body 214 is unable to generate sufficient drag force to move the activation member 208 to the second position, the wellbore projectile may be sent downhole engage the annular lip 334. Upon landing on and sealing against the annular lip 334, pressure within the inner flow path 302 may be increased to provide the axial force required to overcome the spring force of the lower lock ring 210b and thereby bypass the lower lock ring 210b. The annular lip 334 can be further configured to bend, expand, or bow radially outwardly upon application of a predetermined fluid pressure so that the wellbore projectile can be forced out the assembly 200 for cementing operations.

Those skilled in the art will readily appreciate the several advantages that the assembly 200 may provide. For instance, the assembly 200 allows required surface circulation, but is not dependent on a wellbore projectile to deactivate the flapper 206 (i.e., move the flapper 206 to the closed position). Moreover, as opposed to conventional activation members, incorporation of the drag body 214 may facilitate larger circulation flow paths and increased deactivation accuracy. Larger circulation flow paths through the drag body 214 will make the assembly 200 less susceptible to clogging and erosion, which could otherwise cause early deactivation of the flapper 206 or result in the need for unusually high deactivation flow rates. Accordingly, surface circulation through the assembly 200 can be carried out for extended periods of time, as long as the flow rate is below the flow rate that generates the drag force sufficient to move the activation member 208 to the second position without concern for erosion of flow ports or other critical components.

Embodiments disclosed herein include:

A. A float valve assembly that includes a cylindrical housing that defines an inner flow path, a check valve positioned within the housing and movable between an open position, where fluid flow through the inner flow path in an uphole direction and a downhole direction is allowed, and a closed position, where fluid flow in the uphole direction is prevented while fluid flow in the downhole direction is allowed, an activation member movably positioned within the housing between a first position, where the activation member engages and holds the check valve in the open position, and a second position, where the activation member moves axially within the housing and out of engagement with the check valve, and a drag body coupled to and extending from a downhole end of the activation member, wherein fluid flow in the downhole direction generates a drag force on the drag body that places an axial force on the activation member to move the activation member from the first position to the second position.

B. A method of operating a float valve assembly that includes flowing a fluid to a cylindrical housing that defines an inner flow path, wherein a check valve is positioned within the housing, holding the check valve in an open position with an activation member positioned within the housing in a first position and flowing the fluid through the inner flow path in a downhole direction, generating a drag force on a drag body with the fluid flowing in the downhole direction, wherein the drag body is coupled to and extends from a downhole end of the activation member and the drag force thereby places an axial force on the activation member, increasing a flow rate of the fluid in the downhole direction and thereby generating an increased drag force on the drag body and an increased axial force on the activation member, moving the activation member to a second position and out of engagement with the check valve in response to the increased axial force, and moving the check valve to a closed position where fluid flow in an uphole direction within the inner flow path is prevented while fluid flow in the downhole direction is allowed.

C. A method that includes advancing a float valve assembly coupled to a casing into a wellbore, the float valve assembly including a cylindrical housing that defines an inner flow path, wherein a check valve is positioned within the housing and held in an open position with an activation member positioned within the housing in a first position flowing a fluid through the inner flow path in an uphole direction as the float valve assembly advances within the wellbore, circulating a fluid through the inner flow path in a downhole direction upon locating the casing at a desired location, generating a drag force on a drag body with the fluid flowing in the downhole direction, wherein the drag body is coupled to and extends from a downhole end of the activation member and the drag force thereby places an axial force on the activation member, increasing a flow rate of the fluid in the downhole direction and thereby generating an increased drag force on the drag body and an increased axial force on the activation member, moving the activation member to a second position and out of engagement with the check valve in response to the increased axial force, and moving the check valve to a closed position where fluid flow in an uphole direction within the inner flow path is prevented while fluid flow in the downhole direction is allowed.

Each of embodiments A, B, and C may have one or more of the following additional elements in any combination: Element 1: wherein the check valve is a flapper-type check valve that includes a flapper pivotably coupled to the check valve, and wherein the activation member in the first position engages and holds the flapper in the open position and disengages the flapper upon moving to the second position. Element 2: further comprising a radial shoulder defined on an outer surface of the activation member, an upper lock ring positioned on an uphole end of the radial shoulder, and a lower lock ring positioned on a downhole end of the radial shoulder, wherein the axial force on the activation member forces the radial shoulder against the lower lock ring to bypass the lower lock ring. Element 3: wherein the lower lock ring comprises a split lock ring that exhibits a known spring force and the axial force on the activation member allows the radial shoulder to overcome the known spring force. Element 4: wherein the drag body forms an integral extension of the activation member such that the drag body and the activation member form a monolithic structure. Element 5: wherein the drag body comprises a plurality of component parts operatively coupled to the activation member. Element 6: wherein the drag body comprises one or more ribs coupled to the downhole end of the activation member and extending axially therefrom, and a disc coupled to the one or more ribs, wherein the one or more ribs define one or more flow windows through which the fluid flow traverses during operation. Element 7: wherein the disc exhibits a cross-sectional shape selected from the group consisting of circular, oval, kidney-shaped, polygonal, teardrop-shaped, airfoil-shaped and any combination thereof. Element 8: further comprising one or more holes defined in the disc that extend between an uphole face and a downhole face of the disc.

Element 9: wherein a radial shoulder is defined on an outer surface of the activation member, the method further comprising maintaining the activation member in the first position with an upper lock ring positioned on an uphole end of the radial shoulder and a lower lock ring on a downhole end of the radial shoulder. Element 10: wherein moving the activation member to the second position comprises forcing the radial shoulder against the lower lock ring and bypassing the lower lock ring. Element 11: wherein the lower lock ring comprises a split lock ring that exhibits a known spring force, the method further comprising overcoming the known spring force with the increased axial force. Element 12: wherein the drag body includes one or more ribs coupled to the downhole end of the activation member and extending axially therefrom, and a disc coupled to the one or more ribs, and wherein generating the drag force on the drag body comprises impinging the fluid on the one or more ribs and the disc.

Element 13: further comprising pumping a cement through the float valve assembly in the downhole direction, and preventing the cement from back flowing through the float valve assembly in the uphole direction with the check valve. Element 14: wherein a radial shoulder is defined on an outer surface of the activation member, the method further comprising maintaining the activation member in the first position with an upper lock ring positioned on an uphole end of the radial shoulder and a lower lock ring on a downhole end of the radial shoulder, and forcing the radial shoulder against the lower lock ring and thereby bypassing the lower lock ring to move the activation member to the second position. Element 15: wherein the lower lock ring comprises a split lock ring that exhibits a known spring force, the method further comprising overcoming the known spring force with the increased axial force. Element 16: further comprising modifying a geometry of the drag body and thereby altering the drag force generated by the drag body and the axial force assumed by the activation member. Element 17: wherein the drag body includes one or more ribs coupled to the downhole end of the activation member and extending axially therefrom, and a disc coupled to the one or more ribs, and wherein modifying the geometry of the drag body comprises altering at least one of a shape and a size of one or both of the disc and the one or more ribs. Element 18: wherein the drag body includes one or more ribs coupled to the downhole end of the activation member and extending axially therefrom, and a disc coupled to the one or more ribs, and wherein modifying the geometry of the drag body comprises switching out at least one of the disc and the one or more ribs with a corresponding disc or a corresponding one or more ribs that exhibit at least one of a different size, a different configuration, or made of a different material.

By way of non-limiting example, exemplary combinations applicable to A, B, and C include: Element 2 with Element 3; Element 6 with Element 7; Element 6 with Element 8; Element 9 with Element 10; Element 10 with Element 11; Element 14 with Element 15; Element 16 with Element 17; and Element 17 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A float valve assembly, comprising:
 a cylindrical housing that defines an inner flow path;
 a check valve positioned within the housing and movable between an open position and a closed position, wherein when in the open position both a fluid flow through the inner flow path in an uphole direction and a fluid flow through the inner flow path in a downhole direction is allowed, and when in the closed position the fluid flow in the uphole direction is prevented while the fluid flow in the downhole direction is allowed;
 an activation member positioned within the housing and operable to be moved from a first position to a second position, wherein when in the first position the activation member engages and holds the check valve in the open position, and when in the second position the activation member is out of engagement with the check valve and allows the check valve to move to the closed position; and
 a drag body coupled to and extending from a downhole end of the activation member, the drag body configured such that the activation member moves from the first position to the second position when a flow rate of the fluid flow only in the downhole direction is increased to a level that correspondingly increases a drag force generated by drag body and thereby increases a corresponding axial force exerted on the activation member by the drag body to a pre-determined level.

2. The float valve assembly of claim 1, wherein the check valve is a flapper-type check valve that includes a flapper pivotably coupled to the check valve, and wherein the activation member in the first position engages and holds the flapper in the open position and disengages the flapper upon moving to the second position.

3. The float valve assembly of claim 1, further comprising:
 a radial shoulder defined on an outer surface of the activation member;
 an upper lock ring positioned on an uphole end of the radial shoulder; and
 a lower lock ring positioned on a downhole end of the radial shoulder, wherein the axial force on the activation member forces the radial shoulder against the lower lock ring to bypass the lower lock ring.

4. The float valve assembly of claim 3, wherein the lower lock ring comprises a split lock ring that exhibits a known spring force and the axial force on the activation member allows the radial shoulder to overcome the known spring force when the axial force exerted on the activation member exceeds the predetermined level based on the increased flow rate.

5. The float valve assembly of claim 1, wherein the drag body forms an integral extension of the activation member such that the drag body and the activation member form a monolithic structure.

6. The float valve assembly of claim 1, wherein the drag body comprises a plurality of component parts operatively coupled to the activation member.

7. The float valve assembly of claim 1, wherein the drag body comprises:
 one or more ribs coupled to the downhole end of the activation member and extending axially therefrom; and
 a flat planar-shaped disc coupled to the one or more ribs, wherein the one or more ribs define one or more flow windows through which the fluid flow traverses during operation.

8. The float valve assembly of claim 7, wherein the disc exhibits a cross-sectional shape selected from the group consisting of circular, oval, kidney-shaped, polygonal, teardrop-shaped, airfoil-shaped and any combination thereof.

9. The float valve assembly of claim 7, further comprising one or more holes defined in the disc that extend between an uphole face and a downhole face of the disc.

10. A method of operating a float valve assembly, comprising:
 flowing a fluid to a cylindrical housing that defines an inner flow path, wherein a check valve is positioned within the housing;
 holding the check valve in an open position with an activation member positioned within the housing in a first position and flowing the fluid through the inner flow path in a downhole direction;
 generating a drag force on a drag body with the fluid flowing only in the downhole direction, wherein the drag body is coupled to and extends from a downhole end of the activation member and the drag force thereby places an axial force on the activation member;
 increasing a flow rate of the fluid in the downhole direction and thereby generating an increased drag force on the drag body and an increased axial force on the activation member;
 moving the activation member to a second position and out of engagement with the check valve in response to the increased axial force exerted on the activation member exceeding a predetermined level corresponding to the increased flow rate; and
 after moving the activation member so that the activation member is out of engagement with the check valve, moving the check valve to a closed position where fluid flow in an uphole direction within the inner flow path is prevented while fluid flow in the downhole direction is allowed.

11. The method of claim 10, wherein a radial shoulder is defined on an outer surface of the activation member, the method further comprising maintaining the activation member in the first position with an upper lock ring positioned on an uphole end of the radial shoulder and a lower lock ring on a downhole end of the radial shoulder.

12. The method of claim 11, wherein moving the activation member to the second position comprises forcing the radial shoulder against the lower lock ring and bypassing the lower lock ring.

13. The method of claim 12, wherein the lower lock ring comprises a split lock ring that exhibits a known spring force, the method further comprising overcoming the known spring force with the increased axial force.

14. The method of claim 10, wherein the drag body includes one or more ribs coupled to the downhole end of the activation member and extending axially therefrom, and a flat planar-shaped disc coupled to the one or more ribs, and wherein generating the drag force on the drag body comprises impinging the fluid on the one or more ribs and the disc.

15. A method, comprising:
advancing a float valve assembly coupled to a casing into a wellbore, the float valve assembly including a cylindrical housing that defines an inner flow path, wherein a check valve is positioned within the housing and held in an open position with an activation member positioned within the housing in a first position;
flowing a fluid through the inner flow path in an uphole direction as the float valve assembly advances within the wellbore;
circulating a fluid through the inner flow path in a downhole direction upon locating the casing at a desired location;
generating a drag force on a drag body with the fluid flowing only in the downhole direction, wherein the drag body is coupled to and extends from a downhole end of the activation member and the drag force thereby places an axial force on the activation member;
increasing a flow rate of the fluid in the downhole direction and thereby generating an increased drag force on the drag body and an increased axial force on the activation member;
moving the activation member to a second position and out of engagement with the check valve in response to the increased axial force exerted on the activation member exceeding a predetermined level corresponding to the increased flow rate; and
after moving the activation member to the second position so that the activation member is out of engagement with the check valve, moving the check valve to a closed position where fluid flow in an uphole direction within the inner flow path is prevented while fluid flow in the downhole direction is allowed.

16. The method of claim 15, further comprising:
after moving the activation member to the second position, pumping a cement through the float valve assembly in the downhole direction while preventing the cement from back flowing through the float valve assembly in the uphole direction with the check valve.

17. The method of claim 15, wherein a radial shoulder is defined on an outer surface of the activation member, the method further comprising:
maintaining the activation member in the first position with an upper lock ring positioned on an uphole end of the radial shoulder and a lower lock ring on a downhole end of the radial shoulder; and
forcing the radial shoulder against the lower lock ring and thereby bypassing the lower lock ring to move the activation member to the second position when the axial force exerted on the activation member exceeds the predetermined level based on the increased flow rate.

18. The method of claim 15, wherein the drag body is selected based upon a predetermined drag force for a given level of fluid flow only in the downhole direction.

19. The method of claim 15, wherein the drag body includes one or more ribs coupled to the downhole end of the activation member and extending axially therefrom, and a flat planar-shaped disc coupled to the one or more ribs.

20. The method of claim 15, wherein the drag body includes one or more ribs coupled to the downhole end of the activation member and extending axially therefrom, and a disc coupled to the one or more ribs, the method further comprising exchanging the drag body with a the different drag body including switching out at least one of the disc and the one or more ribs with a corresponding disc or a corresponding one or more ribs that comprise at least one of a different size, a different configuration, or made of a different material.

\* \* \* \* \*